US008665574B2

(12) United States Patent
Studer, II et al.

(10) Patent No.: US 8,665,574 B2
(45) Date of Patent: Mar. 4, 2014

(54) THERMAL MEMORY IN A FAULT POWERED SYSTEM

(75) Inventors: Richard Allen Studer, II, Wesley, IA (US); Ryan James Moffitt, Coralville, IA (US); Steve M. Meehleder, Cedar Rapids, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 407 days.

(21) Appl. No.: 12/945,616

(22) Filed: Nov. 12, 2010

(65) Prior Publication Data

US 2012/0123762 A1  May 17, 2012

(51) Int. Cl.
*H02H 3/08* (2006.01)
(52) U.S. Cl.
USPC .......................................... 361/93.6
(58) Field of Classification Search
USPC .......................................... 361/93.6
See application file for complete search history.

(56) References Cited

U.S. PATENT DOCUMENTS

| | | | |
|---|---|---|---|
| 4,054,934 A | 10/1977 | Riebs | |
| 4,631,625 A | 12/1986 | Alexander et al. | 361/94 |
| 4,939,437 A | 7/1990 | Farag et al. | 318/473 |
| 5,418,677 A * | 5/1995 | Engel | 361/25 |
| 5,585,995 A | 12/1996 | Baurand et al. | |
| 5,604,687 A * | 2/1997 | Hwang et al. | 703/12 |
| 7,369,389 B2 | 5/2008 | Vicente et al. | 361/115 |
| 7,742,305 B2 | 6/2010 | Schweigert et al. | |
| 2001/0008541 A1 | 7/2001 | Andersen | 374/45 |
| 2005/0083616 A1 | 4/2005 | Reid et al. | 361/42 |
| 2007/0165349 A1 | 7/2007 | Parker | 361/103 |
| 2012/0092797 A1 * | 4/2012 | Reeder et al. | 361/31 |

OTHER PUBLICATIONS

Collombet, Michael et al.: "*n° 182 LV Circuit-Breakers Confronted With Harmonic, Transient and Cyclic Currents*," Apr. 1997, (16 pages).
Zientek, P.E. et al.: "*MicroLogic Trip Unit Applied to Welding Loads*," Mar. 29, 2001 (22 pages).
Data Bulletin: "*Determining the Difference Between Thermal Memory and Thermal Imaging*," Mar. 2003 (3 pages).
International Search Report, PCT/US2011/057197, mailed Jun. 29, 2012 (3 pages).
Written Opinion, PCT/US2011/057197, mailed Jun. 29, 2012 (5 pages).

* cited by examiner

*Primary Examiner* — Scott Bauer
(74) *Attorney, Agent, or Firm* — Locke Lord LLP

(57) ABSTRACT

A circuit breaker system for providing thermal protection to a conductor conducting current from a power source to a load. While the power source is connected to the load, a microcontroller is powered by the current passing through the conductor to thermally model the temperature of the conductor. If the microcontroller determines that the temperature of the conductor has risen to an undesirable or unsafe level, the circuit breaker disconnects the power source from the load and the current no longer passes through the conductor. With no current passing through the conductor, the microcontroller no longer receives power from the conductor. Instead, the microcontroller continues to model the temperature of the conductor as the conductor cools to an ambient temperature by receiving power from an energy storage device. Accordingly, the microcontroller continuously models the temperature of the conductor until the temperature of the conductor cools to the ambient temperature.

21 Claims, 2 Drawing Sheets

THERMAL MEMORY IN A FAULT POWERED SYSTEM

FIELD OF THE INVENTION

The present disclosure relates generally to circuit breakers, and, more particularly, to an microcontroller-based circuit breaker modeling the accumulated heat of the system to protect against thermal faults.

BACKGROUND

Circuit breakers provide protection for conductors and loads. When the circuit breaker is closed and current is flowing through the circuit breaker, the circuit breaker provides thermal protection by monitoring the current passing through the circuit breaker to a load being protected by the circuit breaker and simulating the heating of the circuit breaker or load. If the primary conductors become too hot, their insulation will melt and its insulating properties will be compromised. Under such circumstances, the load protected by the circuit breaker can also be damaged by prolonged exposure to excessive heat.

A traditional thermal-magnetic circuit breaker provides thermal protection by passing current through a bimetal, which deflects as a function of temperature. When current passes through the bimetal, the heat generated in the bimetal models that of the primary conductors, which are also carrying current. When the heating of the bimetal becomes too great, the bimetal opens the circuit in the circuit breaker therefore interrupting the current flow. Without current passing through the circuit breaker, the circuit breaker begins to cool. However, mechanical circuit breakers using bimetal mechanisms typically remain at least partially deflected until the bimetal completely cools.

Electronic circuit breakers provide thermal protection by modeling the temperature of a conductor. Typically, electronic circuit breakers include a microcontroller that is operatively powered by the primary current passing through a primary conductor. The microcontroller is programmed to thermally model a primary conductor by measuring the potential created in a burden resistor when secondary current passes through that resistor. When the circuit breaker is tripped, the primary current in the primary conductor stops flowing and the secondary current drops to zero. Yet, the primary conductors remain at an elevated temperature until sufficient time has passed to allow the primary conductor to cool. For example, if primary current starts to flow again within approximately fifteen minutes, significant residual heat remains in the primary conductors and, thus, the conductors are still at an elevated temperature. This is problematic because after the circuit breaker is tripped and the primary current ceases, the microcontroller is no longer powered and cannot continue to thermally model the primary conductor as it cools. If the circuit breaker is powered up when residual heat remains in the primary conductors, the circuit breaker lacks any "memory" of the thermal history of the primary conductors and may not recognize that a thermal fault still persists quickly enough, compromising the integrity of the insulation on the primary conductors.

One approach uses a resistor-capacitor (RC) circuit that holds a voltage proportional to the temperature of the system. The RC circuit is charged during normal operation (i.e., operation above the thermal pick-up level). After the circuit breaker is tripped, the RC circuit discharges at a known rate. Another similar approach uses a timer circuit to estimate how much time passed from the time a circuit breaker was tripped to the time it was re-initialized. Upon re-initialization of the circuit breaker, the microcontroller will not immediately know the temperature of the primary conductor because it was powered down while the circuit breaker was tripped. To reestablish a thermal model, the microcontroller reads the voltage remaining on the RC circuit or the count on the timer circuit to estimate how much time passed and, assuming a rate of cooling, estimate the cooling of the primary conductor.

However, the RC approach and the timer approach suffer from a number of considerable disadvantages. Significantly, these approaches provide an estimation of the cooling of the primary conductor that is necessarily far less precise than the thermal modeling executed by a microcontroller. For example, the RC and timer approaches cannot take into account fluctuations in ambient temperature or other environmental factors that can affect the rate of cooling of a primary conductor. Additionally, after manufacture, the RC circuit or timer circuit cannot easily be modified to adjust for different operating conditions or protected loads. Further, RC circuits or timer circuits add cost and complexity to the system.

BRIEF SUMMARY

The present disclosure provides a precise, flexible, and easy-to-implement approach to modeling the temperature of a circuit breaker. A microcontroller is programmed to continuously model the temperature of a conductor that conducts current from a power source to a load protected by the circuit breaker. As current is passing through the conductor, heat is generated. The microcontroller is programmed to estimate the temperature of the conductor using a thermal model based on a measurement of the current passing through the conductor.

While the power source is connected to the load, the microcontroller is powered by the current passing through the conductor. If the microcontroller determines that the temperature of the conductor has risen to an undesirable or unsafe level, the circuit breaker disconnects the power source from the load and the current no longer passes through the conductor. With no current passing through the conductor, the microcontroller no longer receives power from the conductor. Instead, the microcontroller continues to model the temperature of the conductor uninterrupted as the conductor cools by receiving power from an energy storage device. The energy storage device stores energy while current is passing through the conductor and supplies the stored energy to the microcontroller when current is not passing through the conductor.

Advantageously, the circuit breakers disclosed herein thermally model the cooling of the conductor using a microcontroller. Accordingly, the circuit breakers disclosed herein provide for significantly more sophisticated and accurate thermal models of the temperature of the conductor than circuit breakers that use a RC circuit or a timer circuit to estimate a thermal model when the power source is disconnected from the load. Additionally, the circuit breakers disclosed herein allow a user to modify the thermal model that is implemented by the microcontroller, thus providing substantial flexibility in thermally modeling the temperature of the conductor while the power source is disconnected from the load.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
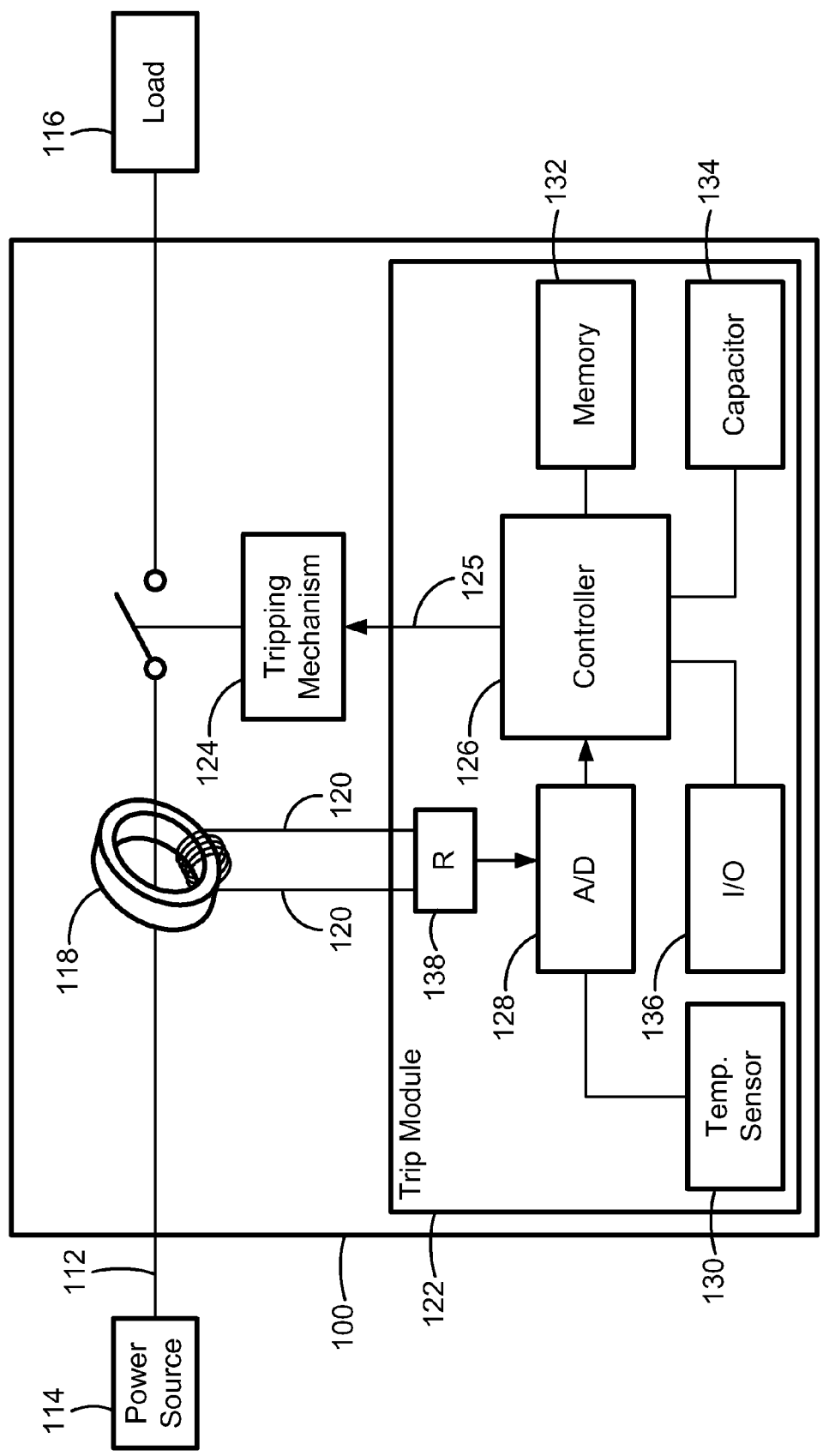
FIG. 1 is a functional diagram of a circuit breaker according to an aspect of the present disclosure.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the invention is to cover all modifications, equivalents, and alternatives falling within the spirit and scope of the present disclosure.

DETAILED DESCRIPTION

According to an embodiment, an electronic trip module for a circuit breaker includes a microcontroller to thermally model the accumulation of heat in a primary conductor prior to a trip event and the cooling of the primary conductor both prior to and following a trip event. The trip module monitors the current flowing through the circuit breaker or load via a secondary conductor coupled to the primary conductor. The current through the secondary conductor is converted into a digital representation of the heat accumulated in the primary conductor or the load. If the accumulated heat value exceeds the long time rating of the circuit breaker, the trip module causes the circuit breaker to trip, disconnecting the load from a power source. Once the circuit breaker is tripped, no current passes from the power source to the load through the circuit breaker and, thus, the primary conductor and the load cools due to the lack of additional heating. During and after the trip event, the microcontroller is powered by an independent power source (e.g., an energy storage device) to continue to thermally model the primary conductor until power is returned to the circuit breaker or the circuit breaker system converges to the ambient temperature. The thermal modeling of the cooling during and after the trip event allows the circuit breaker system to trip at a point that thermally protects the circuit breaker system if the circuit breaker was re-engaged after tripping without sufficient time for the circuit breaker system to cool to ambient conditions. Advantageously, the disclosed circuit breakers provide continuous and uninterrupted thermal modeling of the primary conductor. Accordingly, the disclosed circuit breakers achieve significantly more accurate thermal models and thus better protection against thermal faults compared to electronic circuit breakers that utilize RC circuits or timers to thermally model the circuit breaker system after a trip event.

FIG. 1 is a functional block diagram of an exemplary electronic circuit breaker 100 for thermal protection of a primary conductor 112 passing a primary current from a power source 114 to a load 116 (e.g., a motor). The return path for the primary current is not shown in FIG. 1 for ease of illustration, but those skilled in the art will readily appreciate that a return conductor (such as a neutral conductor) for the primary current back to the power source 114 is also connected to a load 116 protected by the circuit breaker 100. The circuit breaker 100 includes a current transformer 118 coupled to the primary conductor 112. A secondary conductor 120 is coupled to the current transformer 118. As the primary current flows through the primary conductor 112, the current transformer 118 induces a secondary current in the secondary conductor 120 that is proportional to the primary current flowing through the primary conductor 112.

The heat generated within the primary conductor 112 is a function of both the magnitude of the primary current and the time for which the primary current flows through the load 116 at the current magnitude. This principle is well known and commonly referred to as the Joule Effect or $I^2t$ heating effect. Accordingly, the secondary current, which is proportional to the primary current, provides an indication of the heat accumulated in the primary conductor 112. A trip module 122 monitors the secondary current to thermally model the accumulated heat in the primary conductor 112. The trip module 122 uses the data generated by the thermal model to detect the occurrence of an overload condition. For example, the trip module 122 can compare values derived from the thermal model to predetermined threshold values based on, for example, the long time trip curve of the circuit breaker 100 to detect an overload condition. In response to an overload condition, the trip module 122 causes a tripping mechanism 124 to disconnect the load 116 being protected by the circuit breaker 100 from the power source 114 thereby initiating a trip event. For example, the tripping mechanism 124 can include a solenoid that activates a latch to open or close the separable electrical contacts or any other well known electromechanical tripping device(s).

In the example illustrated in FIG. 1, the trip module 122 includes a controller 126 in signal communication with an analog to digital converter 128, a temperature sensor 130, a memory 132, an energy storage device, such as a capacitor 134, and an input/output device 136. The controller 126 is also in signal communication with the tripping mechanism 124 through line 125. The analog to digital converter 128 can be integrated with the controller 126, or the analog to digital converter 128 can be external and electrically coupled to the controller 126. The analog to digital converter 128 is electrically coupled to the secondary conductor 120 via a burden resistor 138. As is readily apparent to the skilled artisan, the characteristics of the current transformer 118, the secondary conductor 120 and the burden resistor 138 determine the proportional relationship between the primary current passing through the primary conductor 112 and the secondary current induced in the secondary conductor 120. The analog to digital converter 128 converts the analog secondary current signals to digital signals representative of the instantaneous secondary current, which are then communicated to the controller 126.

The analog to digital converter 128 is further electrically coupled to a temperature sensor 130. The temperature sensor 130 provides a signal that is indicative of the ambient temperature of the circuit breaker system 100. The temperature sensor signal is converted to a digital signal by the analog to digital converter 128 and communicated to the controller 126. The temperature sensor 130 can be, for example, a thermocouple device, a thermopile device, a thermistor, or the like. To better measure the ambient temperature, the temperature sensor 130 can be located a suitable distance away from any heat generating components of the circuit breaker system 100 (e.g., the primary conductor 112). Although the temperature sensor 130 is integrated with the trip module 122 in the embodiment illustrated in FIG. 1, the temperature sensor 130 can be external to the trip module 122.

The controller 126 is configured or programmed to repetitively execute an iterative algorithm as a real-time thermal model of the primary conductor 112 or load 116. The controller 126 can be, for example, a microcontroller, a microprocessor, an application specific integrated circuit (ASIC) device, field programmable gate array (FPGA), programmable logic controller (PLC) or the like. The real-time thermal model provides an indication of the accumulated heat in the primary conductor 112 as a function of the secondary current signal and the ambient temperature signal received by the controller 126 from the analog to digital converter 128. The controller 126 compares the output values of the thermal model to predetermined threshold values to determine whether to generate a trip signal to cause the tripping mechanism 124 to disconnect the power source 114 from the load 116.

The memory 132 can store any data required by the controller 126 for determining the thermal model of the primary conductor 112, determining an overload condition, initiating a trip event, or executing any other functionality. For example, the memory 132 can store the predetermined thresholds for determining an overload condition, application code (e.g., main functionality firmware), initialization parameters, boot code, code for executing the thermal model, code for determining an overload condition, code for setting user defined thresholds for trip event algorithms, check sums to determine whether code is corrupted, lock codes, instantaneous values for short circuit conditions, trip curves, and/or other data. This data can be stored in the memory 132 at the factory, manually entered via the input/output device 136, or remotely downloaded via the input/output device 136. The memory 132 can be integrated with the controller 126, or the memory 132 can be external and electrically coupled to the controller 126. The memory 132 can be, for example, random access memory (RAM), read only memory (ROM), electronic erasable programmable read only memory (EEPROM), flash memory, or other volatile or non-volatile memory.

Calibration, testing, programming and other features are accomplished through the input/output device(s) 136. The input/output device(s) 136, for example, permit the user to select different thresholds for thermal fault conditions. Using the information determined by the thermal model of the primary conductor 112, the controller 126 can provide overload information to a user via the input/output device(s) 136. This permits a user to anticipate tripping due to overload conditions on the primary conductor 112. Additionally, the input/output device 136 can be configured to provide an indication to the user as to the thermal condition of the primary conductor 112 while the circuit breaker 100 is tripped and, thus, provide an indication as to whether the circuit breaker 100 would immediately trip if power were restored. Significantly, the user can use the input/output device(s) 136 to modify the thermal modeling algorithms executed by the controller 126, for example, to account for the specific type of primary conductor 112 or load 116 coupled to the circuit breaker system 100. Because the thermal modeling before and after a trip event are performed by the controller 126, the thermal modeling can be modified for the cooling after a trip event as well as the heating prior to the trip event. By contrast, conventional circuit breakers using RC and timer circuits cannot easily modify the modeling of cooling during a trip event. Accordingly, the circuit breakers described herein advantageously provide substantially increased flexibility as compared to conventional circuit breakers.

The controller 126 and the capacitor 134 receive power from the secondary current while primary current flows through the primary conductor 112. The capacitor 134 can be a high-capacity capacitor, such as having a value on the order of one farad. The capacitance value of the capacitor 134 is a function of a time needed for the primary conductor to cool from a temperature associated with an overload or a short circuit to an ambient temperature and power requirements of the controller 126. As one non-limiting example, the capacitor 134 can have a capacitance of about 47 microfarad to about one farad. However, when the controller 126 initiates a trip and the load 116 is disconnected from the power source 114 by the tripping mechanism 124, the primary current ceases to flow through the primary conductor 112 and, thus, the secondary current also ceases to pass through the secondary conductor 120. As a result, the controller 126 no longer receives operating power from the secondary conductor 120. Instead, the controller 126 is powered exclusively by a current from the discharging capacitor 134, which was charged prior to the trip event by the secondary current. Thus, the controller 126 continues to operate and thermally model the primary conductor 112 as it cools while no primary current flows through the primary conductor 112.

Accordingly, the capacitor 134 is selected to provide a sufficient amount of current as the capacitor 134 discharges to power the controller 126 while it continues to thermally model the primary conductor 112. The controller 126 continues to thermally model the primary conductor 112 until the temperature of the primary conductor 112 converges to the ambient temperature. Thus, the capacitor 134 continues to provide power to the controller 126 until the primary current is restored in the primary conductor 112 or the temperature of the primary conductor 112 converges to the ambient temperature. Accordingly, the capacitor 134 is also selected to store a sufficient electric potential to continue to provide the discharge current to the controller 126 for a period of time sufficient to permit the primary conductor 112 to cool to the ambient temperature of the circuit breaker system 100 in the event that power is not restored to the circuit breaker system 100 prior to the primary conductor 112 converging to the ambient temperature. Once the power source 114 is reconnected to the load 116 and primary current again flows through the primary conductor 112, the capacitor 134 is recharged at a rate that does not deteriorate the performance of the trip module 122. The secondary current also powers the controller 126 after the power source 114 is reconnected to the load 116.

If the controller 126 determines that the temperature of the primary conductor 112 converged to the ambient temperature while the circuit breaker 100 is tripped or turned off (i.e., the power source 114 is disconnected from the load 116), the controller 126 can cease to thermally model the temperature of the primary conductor 112. The controller 126 can enter a standby or sleep mode. Upon restoration of power to the circuit breaker system 100 (i.e., the power source 114 is reconnected to the load 116 or the load 116 is energized), the controller 126 once again receives operating power from the secondary current and resumes the thermal modeling of the primary conductor 112 by using the ambient temperature as the initial temperature of the primary conductor 112. In other words, because the controller 126 determined that the primary conductor 112 converged to the ambient temperature, the thermal model need not retain any thermal memory of the primary conductor 112.

If the power source 114 is reconnected to the load 116 prior to the controller 126 determining that the primary conductor 112 converged to the ambient temperature, the controller 126 continues to thermally model the primary conductor 112 uninterrupted and the controller 126 is once again powered by the secondary current instead of the capacitor 134. If an operator attempts to turn the circuit breaker system 100 on shortly after a thermal fault, the controller 126 will already have all the information needed to determine whether the circuit breaker system 100 remains in a thermal fault condition and should be immediately tripped.

Figure 2:
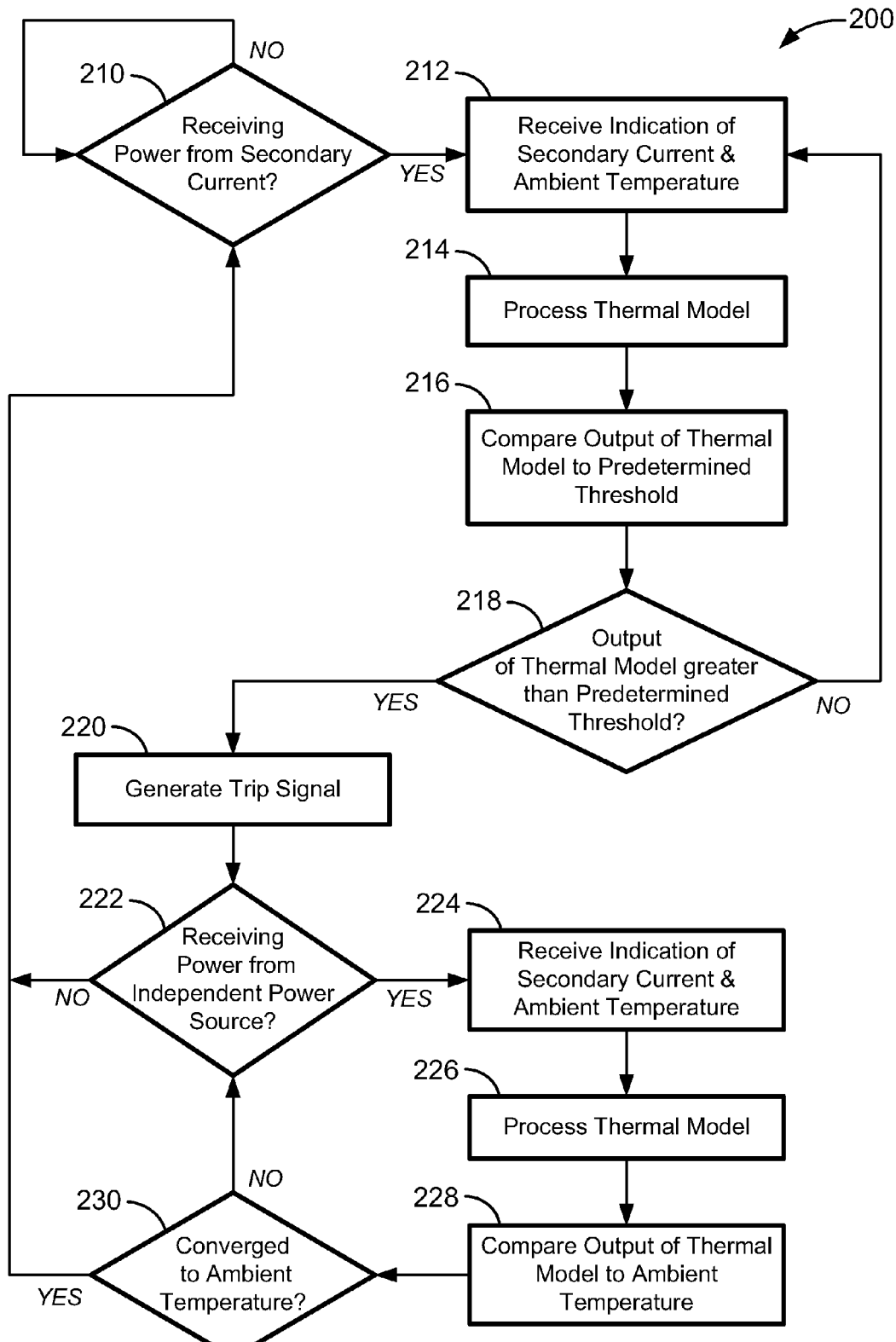
FIG. 2 is a flowchart of a process for operation of a controller of a circuit breaker according to an aspect of the present disclosure.

A flowchart illustrating an exemplary algorithm 200 for a controller, such as the controller 126, is shown in FIG. 2. At decision block 210, the controller 126 determines whether it is receiving power from the secondary current. If the controller 126 is not receiving power from the secondary current, the algorithm 200 loops back to block 210 until the controller 126 determines that it is receiving power from the secondary current. If the controller 126 determines that it is receiving power from the secondary current, the controller 126 receives one or more signals that are indicative of the secondary current and the ambient temperature at block 212. According to some embodiments, the signals indicative of the secondary current and the ambient temperature can be provided by a single analog to digital converter. In other embodiments, the signals can be provided by separate analog to digital converters or the controller can include one or more integrated analog to digital converters for processing of the signals indicative of the secondary current and ambient temperature. Using the indications of the secondary current and the ambient temperature, the controller 126 processes a thermal model of the temperature of the primary conductor to determine one or more thermal model output values at block 214.

At block 216, the controller 126 compares the one or more thermal model output values to one or more predetermined or user-defined threshold values based on the handle ratings (i.e., the current ratings) and long-time trip curves of the circuit breaker. At decision block 218, the controller 126 determines whether the thermal model output value(s) are greater than the predetermined or user-defined threshold value(s). If the controller 126 determines that the thermal model output value(s) are less than the threshold value(s), the controller 126 returns to block 212. If the controller 126 determines that the thermal model output value(s) are greater than the threshold value(s), the controller 126 generates a trip signal at block 220 to cause the circuit breaker to trip. It is contemplated that, according to other embodiments, the controller 126 can determine whether thermal model output value(s) are greater than, less than, equal to, and/or within a bound range of threshold value(s) to determine whether to generate a trip signal at block 220.

At decision block 222, the controller 126 determines whether the controller 126 is receiving operating power from an independent power source (e.g., an energy storage device such as, for example, the capacitor 134). The controller 126 receives power from the independent power source when the circuit breaker is tripped (or insufficient primary current is flowing through the circuit breaker) and sufficient energy remains in the independent power source. If the controller 126 determines that it is not being powered by the independent power source at block 222, the controller returns to block 210. This may occur when the circuit breaker has been re-initialized such that the secondary current powers the controller or when the independent power source can no longer supply power to the controller 126. As explained above, the independent power source and controller 126 can be configured such that if the circuit breaker has not been re-initialized and the independent power source no longer supplies power to the controller 126, the primary conductor will have already converged to the ambient temperature of the circuit breaker.

If, at block 222, the controller 126 determines that the controller 126 is receiving power from the independent power source, the controller 126 continues to receive the signal(s) indicative of the secondary current (which will now be zero due to the lack of secondary current while the circuit breaker is open) and the ambient temperature at block 224. Using the indications of the secondary current and the ambient temperature, the controller 126 continues to process the thermal model of the temperature of the primary conductor at block 226. Significantly, the controller 126 can model the cooling of the primary conductor 112 while the circuit breaker is tripped using the same thermal model that the controller 126 used to model the heating and cooling of the primary conductor prior to tripping the circuit breaker. This provides substantially more accurate thermal models than conventional circuit breakers.

At block 228, the controller 126 compares the thermal model output value(s) to one or more values that are indicative of the ambient temperature of the circuit breaker. It is contemplated that the comparison can be a determination of whether the thermal model output value(s) are greater than, less than, equal to, and/or within a bound range of the ambient temperature value(s). The ambient temperature value(s) are based on the ambient temperature signals received by the controller 126 at block 224. If the controller 126 determines, at block 230, that temperature of the primary conductor has not converged to the ambient temperature based on the comparison at block 228, the algorithm 200 returns to block 222. If the controller 126 determines, at block 230, that the temperature of the primary conductor converged to the ambient temperature, the algorithm 200 returns to block 210. In other words, because the controller 126 determined that the temperature of the primary conductor converged to the ambient temperature, there is no longer any need to continue to thermally model the circuit breaker while it is tripped.

Thermal modeling of the primary conductor or the load will be readily apparent to one of ordinary skill in the art using known thermodynamic and electrical equations and known modeling tools. For example, according to an exemplary embodiment, the controller 126 can be programmed to execute an iterative algorithm as a real-time thermal model based on $I^2t$ heating of the first conductor. According to the Joule Effect, the heat generated by the first conductor is proportional to the square of the primary current according to Equation 1.

$$Pth(t) = A \cdot I^2 t \qquad \text{(Equation 1)}$$

where Pth(t) is the heat at time t, A is a constant depending on the resistance, mass and specific heat of the first conductor, and I is the current passing through the first conductor. The cooling of the primary conductor due to conduction, convection and radiation is proportional to the difference in temperature between the primary conductor and the ambient temperature. Thus, the cooling of the primary conductor can be determined by Equation 2.

$$Pth(t) = \lambda \cdot \Theta dt \qquad \text{(Equation 2)}$$

where $\lambda$ is a constant depending on the physical and geometrical characteristics of the primary conductor and $\theta$ is the difference in temperature between the primary conductor and the ambient temperature. Accordingly, a time-domain thermal equation for the primary conductor can be expressed by Equation 3.

$$d\Theta = A \cdot I^2 t - \lambda \cdot \Theta dt \qquad \text{(Equation 3)}$$

From Equation 3, the thermal equation of the primary conductor can be expressed by Equation 4.

$$\Theta(t + \Delta t) = \Theta(t) \cdot e^{-\frac{\Delta t}{\tau}} + A \cdot I^2 \left(1 - e^{-\frac{\Delta t}{\tau}}\right) \qquad \text{(Equation 4)}$$

where $\tau$ is the thermal time constant of the primary conductor, which is equivalent to $1/\lambda$, and $\Delta t$ is the interval of time between two calculations of the thermal equation. The thermal time constant of the primary conductor depends on the cross-section and specific heat of the primary conductor.

Thus, the primary conductor can be defined according to the circuit breaker sizing, which establishes a range of applicable conductors. Solving for the thermal time constant of the conductor results in Equation 5.

$$\tau = \frac{T_R}{\ln\left[\frac{1}{1-\left[\frac{(1.125 \cdot I_R)^2}{(6 \cdot I_R)^2}\right]}\right]} \quad \text{(Equation 5)}$$

where $I_R$ is the handle rating of the circuit breaker and $T_R$ is the long-time delay at a multiple of six times the handle rating current, $I_R$, and 1.125 is a constant that accounts for signal chain tolerance and assists in mitigating nuisance tripping.

If the analog to digital converter samples the secondary current with a sample period, $\Delta t$, that is substantially less than the thermal time constant, $\tau$, of the primary conductor, it can be approximated that $$e^{-\frac{\Delta t}{\tau}} \approx 1 - \frac{\Delta t}{\tau},$$

which results in Equation 6.

$$\Theta(t + \Delta t) = \Theta(t) + \frac{\Delta t}{\tau}(A \cdot I^2 - \Theta(t)) \quad \text{(Equation 6)}$$

If the circuit breaker system is designed such that $$\alpha \approx \frac{\Delta t}{\tau},$$

the thermal model of the circuit breaker system can be expressed according to Equation 7.

$$\Theta_{k+1} = \Theta_k + \alpha \lfloor A \cdot I_K^2 - \Theta_k \rfloor \quad \text{(Equation 7)}$$

where $\Theta_{k+1}$ represents the accumulated heat of the system after k+1 samples, $\Theta_k$ represents the accumulated heat of the system after an integer number, k, samples, and $I_K$ is the input current from the analog to digital converter. Consequently, Equation 7 is calculated by sampling the secondary current to provide a representation of the conductor temperature. The resulting value determined for $\Theta_{k+1}$ is then compared to predetermined threshold values, which define whether a thermal fault exists based on the long-time trip delay curves.

In another example of a thermal model, a binary shifting technique can be utilized in conjunction with Equation 4 to model the primary conductor. Because some controllers may not be able to calculate exponentials, the sampling period, $\Delta t$, can be selected such that $$\left(1 - e^{-\frac{\Delta t}{\tau}}\right)$$

is a known value and preferably a power of two. For example, a circuit breaker frame that is available with eight different handle ratings, $I_R$, between 300 amps and 800 amps and a long time delay, $T_R$, of 12 seconds, at six times the handle rating, and a thermal time constant, $\tau$, of 335.298 for each of the handle ratings within this breaker frame, the sample period, $\Delta t$, can be chosen as 164 milliseconds. Thus, the value of $$\left(1 - e^{-\frac{\Delta t}{\tau}}\right)$$

will be $$\frac{1}{2^{11}}.$$

Because this is a power of two, the controller does not have to use a multiply or divide operation, which would otherwise consume several clock cycles to execute. Instead, the controller can simply right shift eleven times, with each shift taking only one clock cycle. Using such a binary shift technique, Equation 8 can be derived from Equation 4 to thermally model the primary conductor.

$$\sum_n \left[\left[\frac{\sum_0^{84} x_i^2}{2^{11}} + y_n\right] \cdot \frac{1}{2} \cdot \left(1 - \frac{1}{2^{11}}\right) + \frac{\sum_0^{84} x_i^2}{2^{11}}\right] = y_{n+1} \quad \text{(Equation 8)}$$

where x is the sample of a specific phase of current and y is the accumulated heat of the system in that phase.

While two basic thermal models are explained above for illustrative purposes, it will be readily apparent to one of ordinary skill in the art that other algorithms for thermal models can be provided to the controller from memory or loaded in memory using known thermodynamic and electrical equations and known modeling tools. Although a single-phase or single pole circuit breaker is shown in FIG. 1, it will be appreciated by one of ordinary skill in the art that the aspects of the present disclosure are equally applicable to a multi-phase or multiple pole circuit breakers as well.

While the embodiment illustrated and described for FIG. 1 includes a tripping mechanism that is actuated by a signal from the controller, it will be appreciated that, in some embodiments, the circuit breaker can be tripped without the involvement of the controller. For example, the primary conductor can include a bimetal mechanism that deflects based on the actual temperature of the primary conductor. In such embodiments, the controller will still maintain a thermal model of the primary conductor for various reasons other than or in addition to detecting a thermal fault and initiating a trip. For example, a thermal model can be processed for purposes of notifying a user of the thermal condition of the primary conductor via an input/output device.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A circuit breaker for protecting a load, comprising
 a temperature sensor that measures an ambient temperature of the circuit breaker;

a primary conductor for conducting a primary current from a power source, through the circuit breaker, to a load being protected by the circuit breaker;

a current transformer coupled to the primary conductor;

a secondary conductor coupled to the current transformer such that a secondary current is induced in the secondary conductor in response to the primary current flowing in the primary conductor;

an energy storage device that stores energy related to the secondary current in response to the primary current passing through the primary conductor;

a trip module that includes a controller programmed to continuously process a thermal model of the primary conductor while the primary current is passing through the primary conductor and, if the primary current is not passing through the primary conductor, until the thermal model indicates that the temperature of the primary conductor converges to about the ambient temperature measured by the temperature sensor as the controller is being powered by the energy stored in the energy storage device.

2. The circuit breaker of claim 1, wherein the energy storage device is a high-capacity capacitor.

3. The circuit breaker of claim 2, wherein the high-capacity capacitor is in the trip module.

4. The circuit breaker of claim 1 further comprising the trip module further including an analog to digital converter coupled to the secondary conductor, the analog to digital converter being configured to provide a digital signal indicative of the secondary current to the controller.

5. The circuit breaker of claim 4, wherein the analog to digital converter is in further electrical communication with a temperature sensor configured to provide an indication of the ambient temperature of the circuit breaker, the analog to digital converter being further configured to provide a signal that is indicative of the ambient temperature to the controller, the controller being programmed to process the thermal model based on the indication of the ambient temperature.

6. The circuit breaker of claim 4, wherein the thermal model includes a function that includes root-mean-squared (RMS) values of the secondary current and physical and geometric characteristics of the primary conductor.

7. The circuit breaker of claim 6, wherein the function is $$\Theta_{k+1} = \Theta_k + \alpha [A \cdot I_K^2 - \Theta_k],$$

where $\Theta_{k+1}$ represents the accumulated heat of the system after k+1 samples, $\Theta_k$ represents the accumulated heat of the system after k samples, A is a constant depending on the resistance, mass and specific heat of the primary conductor, $I_K$ is the digital signal indicative of the secondary current from the analog to digital converter, $\alpha$ is a constant depending on the physical and geometrical characteristics of the primary conductor, and k represents an integer number indicating a sample number.

8. The circuit breaker of claim 1, wherein the thermal model produces an estimation of accumulated heat, y, of the primary conductor according to a function represented by:

$$\sum_n \left[ \left[ \frac{\sum_0^{84} x_i^2}{2^{11}} + y_n \right] \cdot \frac{1}{2} \cdot \left(1 - \frac{1}{2^{11}}\right) + \frac{\sum_0^{84} x_i^2}{2^{11}} \right] = y_{n+1},$$

where x is the secondary current of a phase taken at a sample, i.

9. The circuit breaker of claim 1, wherein the trip module is coupled to a tripping mechanism, the trip module being programmed to detect a thermal fault and communicate a trip signal to the tripping mechanism, the tripping mechanism being configured to disconnect the power source from the load at least in response to receiving the signal from the trip module.

10. The circuit breaker of claim 1, wherein the trip module is configured to direct operating power from the secondary conductor to the controller if the primary current is passing through the primary conductor and to direct operating power from the energy storage device to the controller if the primary current is not passing through the primary conductor.

11. The circuit breaker of claim 1, wherein the thermal model models a cooling of the primary conductor responsive to the tripping mechanism disconnecting the power source from the load.

12. The circuit breaker of claim 1, further comprising an output device for displaying an indication of the temperature of the primary conductor based on the thermal model.

13. The circuit breaker of claim 1, wherein the thermal model is based on the secondary current.

14. A method for modeling thermal characteristics of a primary conductor coupled to a circuit breaker protecting a load, comprising:

powering a controller with a first power source derived from a primary current passing through the primary conductor in the circuit breaker;

inducing, via a current transformer coupled to the primary conductor, a secondary current in a secondary conductor responsive to the primary current passing through the primary conductor;

storing, in a second power source, energy derived from the secondary current induced via the current transformer;

measuring an indication of the primary current passing through the primary conductor;

determining a thermal model of the temperature of the primary conductor using the controller and based at least in part on the measured indication of the primary current while the controller is being powered by the first power source, the thermal model generating an output value indicative of the temperature of the primary conductor;

comparing the output value with a trip value;

generating a trip signal based on the comparing to cause the circuit breaker to disconnect the primary conductor from the load;

responsive to generating the trip signal, powering the controller with the second power source while the primary conductor remains disconnected from the load;

measuring an ambient temperature of the circuit breaker; and determining the thermal model of the temperature of the primary conductor while the controller is being powered by the second power source until the thermal model indicates that the temperature of the primary conductor converges to the ambient temperature measured by the temperature sensor.

15. The method of claim 14, wherein the first power source includes the secondary conductor electrically coupled to the primary conductor by the current transformer.

16. The method of claim 15, wherein the second power source includes a capacitor.

17. The method of claim 16, further comprising charging the capacitor while the controller is powered by the first power source.

18. The method of claim 14, further comprising displaying a representation of the output of the thermal model on an output device of the circuit breaker.

19. The method of claim 14, further comprising receiving the trip value via an input device of the circuit breaker.

20. The method of claim 14, wherein the thermal model includes a function that includes root-mean-squared (RMS) values of the secondary current and physical and geometric characteristics of the primary conductor, the function being represented by:

$$\Theta_{k+1} = \Theta_k + \alpha[A \cdot I_K^2 - \Theta_k],$$

where $\Theta_{k+1}$ represents the accumulated heat of the system after k+1 samples, $\Theta_k$ represents the accumulated heat of the system after k samples, A is a constant depending on the resistance, mass and specific heat of the primary conductor, $I_K$ is the digital signal indicative of the secondary current from the analog to digital converter, $\alpha$ is a constant depending on the physical and geometrical characteristics of the primary conductor, and k represents an integer number indicating a sample number.

21. The method of claim 14, wherein the thermal model produces an estimation of accumulated heat, y, of the primary conductor according to a function represented by:

$$\sum_n \left[ \left[ \frac{\sum_0^{84} x_i^2}{2^{11}} + y_n \right] \cdot \frac{1}{2} \cdot \left(1 - \frac{1}{2^{11}}\right) + \frac{\sum_0^{84} x_i^2}{2^{11}} \right] = y_{n+1},$$

where x is the secondary current of a phase taken at sample, i.

* * * * *